US009930263B2

(12) United States Patent
Terasawa

(10) Patent No.: US 9,930,263 B2
(45) Date of Patent: Mar. 27, 2018

(54) IMAGING APPARATUS, FOR DETERMINING A TRANSMITTANCE OF LIGHT FOR A SECOND IMAGE BASED ON AN ANALYSIS OF A FIRST IMAGE

(71) Applicant: SONY CORPORATION, Tokyo (JP)

(72) Inventor: Takashi Terasawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/122,501

(22) PCT Filed: Feb. 13, 2015

(86) PCT No.: PCT/JP2015/000678
§ 371 (c)(1),
(2) Date: Aug. 30, 2016

(87) PCT Pub. No.: WO2015/151386
PCT Pub. Date: Oct. 8, 2015

(65) Prior Publication Data
US 2017/0078550 A1 Mar. 16, 2017

(30) Foreign Application Priority Data

Mar. 31, 2014 (JP) ................................. 2014-074389

(51) Int. Cl.
H04N 5/235 (2006.01)
H04N 5/225 (2006.01)
(Continued)

(52) U.S. Cl.
CPC ....... H04N 5/2352 (2013.01); G02F 1/13318 (2013.01); G03B 7/08 (2013.01);
(Continued)

(58) Field of Classification Search
CPC .. H04N 5/2352; H04N 5/2353; H04N 5/2254; H04N 5/23216; H04N 5/2356
See application file for complete search history.

(56) References Cited

U.S. PATENT DOCUMENTS

2001/0017985 A1* 8/2001 Tsuboi ..................... G02B 3/14
396/506
2002/0012064 A1* 1/2002 Yamaguchi .......... H04N 5/2254
348/362

(Continued)

FOREIGN PATENT DOCUMENTS

JP 2008-242230 10/2008
JP 2012-84814 A 4/2012

(Continued)

OTHER PUBLICATIONS

International Search Report dated Apr. 28, 2015 in PCT/JP2015/000678 Filed Feb. 13, 2015.

(Continued)

Primary Examiner — Abdelaaziz Tissire
(74) Attorney, Agent, or Firm — Oblon, McClelland, Maier & Neustadt, L.L.P.

(57) ABSTRACT

[Object] To provide a technology of an imaging apparatus capable of outputting image data, which is output from an imaging device, as image data of an appropriate exposure amount, and the like.
[Solving Means] An imaging apparatus according to the present technology includes a transmittance adjustment unit, an imaging device, and a control unit. The transmittance adjustment unit is capable of adjusting a transmittance of light in accordance with an applied voltage. The imaging device performs imaging by exposure of light passing through the transmittance adjustment unit. The control unit acquires first image data by setting a transmittance of the transmittance adjustment unit to a first transmittance and (Continued)

causing the imaging device to perform imaging, calculates a second transmittance on the basis of the first image data to cause the imaging device to perform imaging in an appropriate exposure amount, acquires second image data by setting the transmittance of the transmittance adjustment unit to the second transmittance and causing the imaging device to perform imaging, and outputs the acquired second image data.

9 Claims, 5 Drawing Sheets

(51) Int. Cl.
- *G03B 7/08* (2014.01)
- *G03B 11/00* (2006.01)
- *G02F 1/133* (2006.01)
- *G06T 11/60* (2006.01)
- *H04N 5/232* (2006.01)
- *H04N 5/369* (2011.01)
- *H04N 5/378* (2011.01)

(52) U.S. Cl.
CPC .............. *G03B 11/00* (2013.01); *G06T 11/60* (2013.01); *H04N 5/2254* (2013.01); *H04N 5/235* (2013.01); *H04N 5/2353* (2013.01); *H04N 5/2356* (2013.01); *H04N 5/23216* (2013.01); *G06T 2207/20221* (2013.01); *H04N 5/23293* (2013.01); *H04N 5/369* (2013.01); *H04N 5/378* (2013.01)

(56) References Cited

U.S. PATENT DOCUMENTS

| | | | |
|---|---|---|---|
| 2010/0259636 A1* | 10/2010 | Tzur | ...................... H04N 5/235 348/222.1 |
| 2012/0008005 A1 | 1/2012 | Fukunishi | |
| 2014/0178061 A1* | 6/2014 | Saita | ...................... G03B 7/095 396/241 |
| 2014/0247386 A1 | 9/2014 | Takagi | |
| 2015/0042836 A1* | 2/2015 | Lin | ...................... H04N 5/2353 348/222.1 |
| 2015/0281547 A1* | 10/2015 | Terasawa | ............. H04N 5/2357 348/226.1 |

FOREIGN PATENT DOCUMENTS

| | | |
|---|---|---|
| JP | 2012-104994 A | 5/2012 |
| JP | 2013-88597 A | 5/2013 |
| JP | 2013-251724 A | 12/2013 |
| WO | 2013/031429 A1 | 3/2013 |

OTHER PUBLICATIONS

Extended European Search Report dated Nov. 6, 2017, in EP 15772187.9.

\* cited by examiner

IMAGING APPARATUS, FOR DETERMINING A TRANSMITTANCE OF LIGHT FOR A SECOND IMAGE BASED ON AN ANALYSIS OF A FIRST IMAGE

TECHNICAL FIELD

The present technology relates to a technology of an imaging apparatus that performs imaging with an imaging device, and the like.

BACKGROUND ART

An imaging apparatus capable of capturing still images and moving images has been widely known in the past (see, for example, Patent Document 1 below).

In an imaging apparatus described in Patent Document 1, analog image data acquired in an imaging device is output to an analog signal processing unit. The analog image data, which has been output to the analog signal processing unit, is subjected to analog signal processing (amplification and the like) and then output to an A/D (analog-digital) conversion unit to be converted into digital image data. The digital image data is output to a digital signal processing unit and subjected to noise removal processing, white balance processing, color correction processing, edge enhancement processing, gamma correction processing, and the like in the digital signal processing unit. The digital image data, which has been subjected to those processing, is then output from the digital signal processing unit, and the image data is displayed on a liquid crystal panel and also stored in a recording device.

In order that the image data, which has been output from the imaging device, is output from the digital signal processing unit as image data of an appropriate exposure amount, a method of adjusting an exposure amount within the digital signal processing unit may be used. However, at the time of A/D conversion by the A/D conversion unit, image data of extreme brightness may impair part of gradation thereof at the time of A/D conversion. For that reason, there is a problem that the part impaired at the time of A/D conversion cannot be restored in the digital signal processing unit.

So, in general, a method of adjusting an electronic shutter (adjusting an exposure time in the imaging device), a method of adjusting an aperture of a diaphragm, and the like are used.

Patent Document 1: Japanese Patent Application Laid-open No. 2012-104994 (see paragraphs [0038] and [0055] and FIG. 3)

SUMMARY OF INVENTION

Problem to be Solved by the Invention

However, the method of adjusting an electronic shutter has a problem that a dynamic resolution is disturbed and the quality of image data is degraded. Further, the method of adjusting an aperture of a diaphragm has problems that blurring caused by the diaphragm occurs and a depth of subject varies. As described above, from the viewpoint of degradation in image quality and the like, there has been a problem in the past that image data output from the imaging device cannot be output as image data of an appropriate exposure amount.

In view of the circumstances as described above, it is an object of the present technology to provide a technology of an imaging apparatus capable of outputting image data, which is output from an imaging device, as image data of an appropriate exposure amount, and the like.

Means for Solving the Problem

According to the present technology, there is provided an imaging apparatus including a transmittance adjustment unit, an imaging device, and a control unit.

The transmittance adjustment unit is capable of adjusting a transmittance of light in accordance with an applied voltage.

The imaging device performs imaging by exposure of light passing through the transmittance adjustment unit.

The control unit acquires first image data by setting a transmittance of the transmittance adjustment unit to a first transmittance and causing the imaging device to perform imaging, calculates a second transmittance on the basis of the first image data to cause the imaging device to perform imaging in an appropriate exposure amount, acquires second image data by setting the transmittance of the transmittance adjustment unit to the second transmittance and causing the imaging device to perform imaging, and outputs the acquired second image data.

In the imaging apparatus according to the present technology, a transmittance of the transmittance adjustment unit is set to a first transmittance, and imaging is performed by the imaging device, so that first image data is acquired. The first image data is used to calculate a second transmittance so as to cause the imaging device to perform imaging in an appropriate exposure amount. Since the first image data is data used to calculate a second transmittance, this data is not output from the control unit.

When the second transmittance is calculated, the transmittance of the transmittance adjustment unit is set to the second transmittance (appropriate transmittance), and imaging is performed by the imaging device, so that second image data is acquired. The second image data is then output from the control unit. In such a manner, when the second image data is output from the control unit, the image data output from the imaging device can be output as image data of an appropriate exposure amount. The second image data output from the control unit is used as data for display or data for recording, for example.

In the imaging apparatus, the control unit may acquire the second image data and third image data by setting the transmittance of the transmittance adjustment unit to the second transmittance and causing the imaging device to perform imaging, add the second image data and the third image data, and output the added image data.

In the imaging apparatus, two pieces of image data are acquired with the transmittance of the transmittance adjustment unit being set to the second transmittance (appropriate transmittance). Those two images are added and output as high dynamic range (HDR) image data. As a result, for example, high-dynamic-range image data that holds gradation of high luminance signals can be output.

In the imaging apparatus, the control unit may control the first transmittance to be variable.

In such a manner, when the first transmittance is controlled to be variable, the first transmittance can be appropriately adjusted.

In the imaging apparatus, the imaging device may include a plurality of pixels.

In this case, when the control unit calculates the second transmittance on the basis of the first image data, the control unit may determine a ratio of the number of pixels reaching a saturation signal amount to the total number of pixels in the first image data, and calculate the second transmittance on the basis of the ratio.

In the imaging apparatus, the control unit may repeatedly execute a series of processing of acquiring the first image data, calculating the second transmittance, acquiring the second image data, and outputting the second image data.

When such a series of processing is repeated, the image data output from the imaging device can be constantly output as image data of an appropriate exposure amount.

In the imaging apparatus, the control unit may repeatedly execute a series of processing of acquiring the first image data, calculating the second transmittance, acquiring the second image data and the third image data, adding the second image data and the third image data, and outputting the added image data.

When such a series of processing is repeated, for example, an high-dynamic-range image that holds gradation of high luminance signals can be constantly output.

In the imaging apparatus, the transmittance adjustment unit may be a liquid crystal ND (Neutral Density) filter.

When the liquid crystal ND filter is used as the transmittance adjustment unit, the transmittance can be switched between the first transmittance and the second transmittance at high speed.

According to the present technology, there is provided a method of outputting image data, including acquiring first image data by setting a transmittance of a transmittance adjustment unit to a first transmittance and causing an imaging device to perform imaging, the transmittance adjustment unit being capable of adjusting a transmittance of light in accordance with an applied voltage, the imaging device performing exposure of light passing through the transmittance adjustment unit.

A second transmittance is calculated on the basis of the first image data to cause the imaging device to perform imaging in an appropriate exposure amount.

Second image data is acquired by setting the transmittance of the transmittance adjustment unit to the second transmittance and causing the imaging device to perform imaging.

The acquired second image data is output.

According to the present technology, there is provided a program causing an imaging apparatus to execute the steps of: acquiring first image data by setting a transmittance of a transmittance adjustment unit to a first transmittance and causing an imaging device to perform imaging, the transmittance adjustment unit being capable of adjusting a transmittance of light in accordance with an applied voltage, the imaging device performing exposure of light passing through the transmittance adjustment unit; calculating a second transmittance on the basis of the first image data to cause the imaging device to perform imaging in an appropriate exposure amount; acquiring second image data by setting the transmittance of the transmittance adjustment unit to the second transmittance and causing the imaging device to perform imaging; and outputting the acquired second image data.

Effects of the Invention

As described above, according to the present technology, it is possible to provide a technology of an imaging apparatus capable of outputting image data, which is output from an imaging device, as image data of an appropriate exposure amount, and the like.

MODE(S) FOR CARRYING OUT THE INVENTION

Hereinafter, embodiments according to the present technology will be described with reference to the drawings.

First Embodiment

[Overall Configuration of Imaging Apparatus 1 and Configurations of Respective Units]

Figure 1:
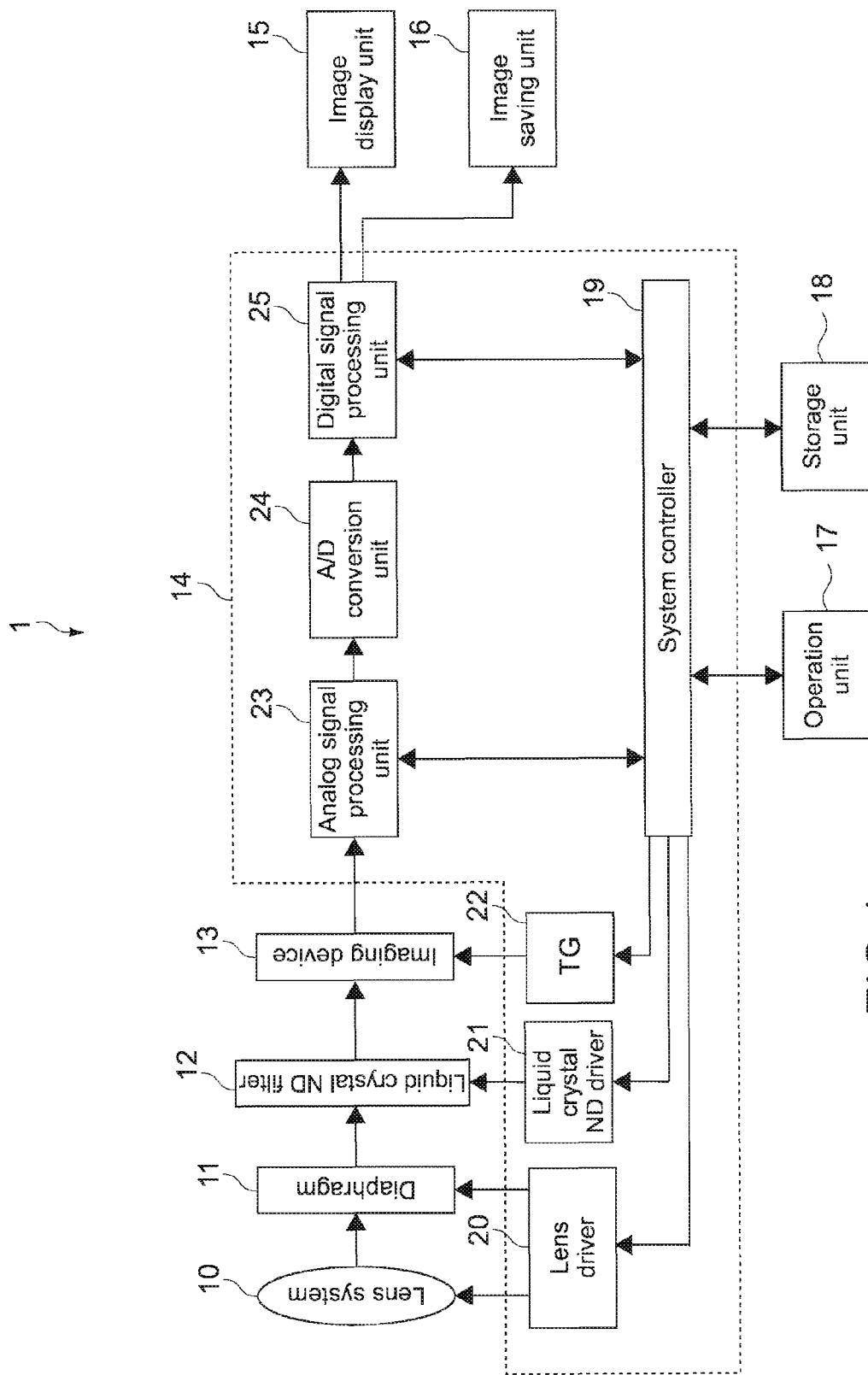
FIG. 1 is a block diagram showing an imaging apparatus according to a first embodiment of the present technology.

FIG. 1 is a block diagram showing an imaging apparatus 1 according to a first embodiment of the present technology. The imaging apparatus 1 shown in FIG. 1 is a digital camera (digital still camera, digital video camera) capable of capturing still images and moving images. Further, the imaging apparatus 1 is capable of reproducing recorded image data.

As shown in FIG. 1, the imaging apparatus 1 includes a lens system 10, a diaphragm 11, a liquid crystal ND (Neutral Density) filter 12 (transmittance adjustment unit), an imaging device 13, a control unit 14, an image display unit 15, an image saving unit 16, an operation unit 17, and a storage unit 18. The control unit 14 includes a system controller 19, a lens driver 20, a liquid crystal ND driver 21, a timing generator 22 (TG), an analog signal processing unit 23, an A/D conversion unit 24, and a digital signal processing unit 25.

The lens system 10 includes various lenses such as a zoom lens and a focus lens and forms an image of subject light on an exposure surface of the imaging device 13 through those lenses. The diaphragm 11 is configured to be capable of mechanically adjusting the amount of subject light by adjusting the aperture thereof. In the example shown in FIG. 1, the diaphragm 11 is disposed behind the lens system 10, but may be disposed in an optical path inside the lens system 10 (for example, between the zoom lens and the focus lens).

The lens driver 20 controls the positions of the zoom lens, the focus lens, and the diaphragm 11 or controls the aperture of the diaphragm 11, in accordance with an instruction from the system controller 19.

The liquid crystal ND filter 12 is configured to be capable of adjusting a transmittance of light (adjusting a density) in accordance with a voltage to be applied. By adjusting a transmittance in accordance with a voltage to be applied, the liquid crystal ND filter 12 adjusts the amount of subject light, which is to be input to the imaging device 13.

The liquid crystal ND driver 21 controls a voltage to be applied to the liquid crystal ND filter 12 and thus controls a transmittance (density) of the liquid crystal ND filter 12 in accordance with an instruction from the system controller 19.

The imaging device 13 is constituted by a CMOS (Complementary Metal Oxide Semiconductor) sensor, a CCD (Charge Coupled Device) sensor, or the like. The imaging device 13 performs imaging by exposure of subject light, which is input thereto through the liquid crystal ND filter 12. Specifically, the imaging device 13 includes a plurality of pixels (R pixels, G pixels, and B pixels). The imaging device 13 converts the subject light, which is input to the exposure surface, into electronic signals on a pixel to pixel basis by photoelectric conversion, and outputs the obtained signals of three primary colors (R, G, and B) as analog image data to the analog signal processing unit 23.

The timing generator (TG) 22 generates a drive pulse, which is needed to drive the imaging device 13, in accordance with an instruction from the system controller 19 and supplies the drive pulse to the imaging device 13. When the timing generator 22 drives the imaging device 13, a subject image is captured (electronic shutter) and acquired. Further, when a shutter speed of the imaging device 13 is adjusted by the timing generator 22, an exposure time at the time an image is captured is controlled.

The analog signal processing unit 23 executes CDS (Correlated Double Sampling) processing, gain processing, and the like on image signals, which are output from the imaging device 13.

The A/D conversion unit 24 converts the analog image data, which is output from the analog signal processing unit 23, into digital image data and outputs the digital image data to the digital signal processing unit 25.

The digital signal processing unit 25 executes various types of digital signal processing, such as noise removal processing, white balance adjustment processing, color correction processing, edge enhancement processing, and gamma correction processing, with respect to the digital image data output from the A/D conversion unit 24, and outputs the digital image data to the image display unit 15 and the image saving unit 16. Further, in a high frame rate mode that will be described later, the digital signal processing unit 25 detects digital image data of the first frame (first image data), which is output from the A/D conversion unit 24, and outputs that digital image data to the system controller 19.

The image display unit 15 is constituted by a liquid crystal display, an organic EL (Electro luminescence) display, or the like. The image display unit 15 displays various images on the screen thereof. For example, the image display unit 15 displays image data, which is output from the digital signal processing unit 25, in real time and thus displays a through image on the screen thereof. Further, the image display unit 15 executes processing of reproducing an image recorded in the image saving unit 16. The through image is displayed on the screen such that a user can adjust an angle of view when capturing a still image or a moving image.

The image saving unit 16 stores the image data, which is output from the digital signal processing unit 25, or metadata associated with the image data (for example, a time and date at which the image data is acquired, etc.). The image saving unit 16 is constituted by, for example, a semiconductor memory, an optical disc, or an HD (hard Disc). The image saving unit 16 may be fixed inside the imaging apparatus 1 or may be configured to be detachable from and attachable to the imaging apparatus 1.

The system controller 19 is constituted by, for example, a CPU (Central Processing Unit) and collectively controls the units of the imaging apparatus 1. Specific processing of the system controller 19 will be described later in detail in the section of the Description of operation.

Here, in this embodiment, a still-image capturing mode for capturing still images, a moving-image capturing mode (recording mode) for capturing moving images, and a reproduction mode for reproducing images recorded in the image saving unit 16 are prepared. In addition, in this embodiment, in each of the still-image capturing mode and the moving-image capturing mode, two modes of a normal mode and a high frame rate (HFR) mode are prepared.

The normal mode is a mode in which imaging is performed at a normal frame rate (for example, 30 fps). On the other hand, the high frame rate mode is a mode in which imaging is performed at a frame rate twice as large as the normal frame rate (for example, 60 fps), and the image data of the first frame (first image data) is used as an image for estimating the exposure amount of the imaging device 13 when image data of the second frame (second image data) is captured (for calculating a transmittance of the liquid crystal ND filter 12).

The storage unit 18 includes a non-volatile memory (for example, ROM (Read Only memory)), in which various programs or various types of data are fixedly stored, and a volatile memory (for example, RAM (Random Access Memory)), which is used as a work area of the system controller 19. The programs described above may be read from portable recording media such as an optical disc and a semiconductor memory or may be downloaded from a server apparatus over a network.

The non-volatile memory stores, as the various types of data described above, a transmittance versus voltage table, a saturation pixel ratio versus exposure amount table, and an exposure amount versus transmittance table are stored.

The transmittance versus voltage table is a table showing a relationship between a transmittance of the liquid crystal ND filter 12 and an applied voltage. When controlling the transmittance of the liquid crystal ND filter 12, the system controller 19 refers to the transmittance versus voltage table and reads an applied voltage corresponding to a target transmittance, to instruct the liquid crystal ND driver 21 to apply the read applied voltage.

The saturation pixel ratio versus exposure amount table is a table used in the high frame rate mode. The saturation pixel ratio versus exposure amount table shows a relationship between a ratio of the number of saturation pixels to the total number of pixels in the image data of the first frame, and the exposure amount of the imaging device 13 at the time the image data of the second frame is captured. Specifically, in the saturation pixel ratio versus exposure amount table, the ratio of the number of saturation pixels to the total number of pixels and the exposure amount of the imaging device 13 are associated with each other such that the exposure amount of the imaging device 13 is reduced as the ratio of the number of saturation pixels to the total number of pixels increases.

In the high frame rate mode, when the exposure amount of the imaging device 13 at the time the image data of the second frame is acquired is estimated on the basis of the image data of the first frame, the system controller 19 refers to the saturation pixel ratio versus exposure amount table to estimate the exposure amount of the imaging device 13.

The exposure amount versus transmittance table is a table used in the high frame rate mode, as in the case of the saturation pixel ratio versus exposure amount table. The exposure amount versus transmittance table shows a relationship between an estimated exposure amount and a second transmittance. The second transmittance is a transmittance of the liquid crystal ND filter 12 at the time the second image data is acquired. Specifically, in the exposure amount versus transmittance table, the exposure amount and the second transmittance are associated with each other such that the second transmittance increases as the estimated exposure amount increases.

When calculating the second transmittance on the basis of the estimated exposure amount of the imaging device 13, the system controller 19 refers to the exposure amount versus transmittance table to calculate the second transmittance.

The operation unit 17 includes, for example, a power switch, a shutter button, a recording button, a setting button, and a mode switching button. The power switch is the operation unit 17 for switching ON/OFF of power of the imaging apparatus 1. Further, the shutter button is the operation unit 17 for recording image data as still image data in the still-image capturing mode. The recording button is the operation unit 17 for recording image data as moving image data in the moving-image capturing mode.

The setting button is used for, for example, adjusting the positions of the zoom lens, the focus lens, and the diaphragm 11 or adjusting the aperture of the diaphragm 11. Further, the setting button is used for adjusting the electronic shutter, changing a gain value of the gain processing in the analog signal processing unit 23, or changing set values of various types of processing by the digital signal processing unit 25. The mode switching button is the operation unit 17 for switching between the normal mode and the high frame rate mode.

The operation unit 17 may be achieved by a mechanical push-button operation unit 17 or may be achieved by a touch sensor of a capacitive system, a resistive system, or the like, which is provided on the image display unit 15.

[Description on Operation]

Figure 2:
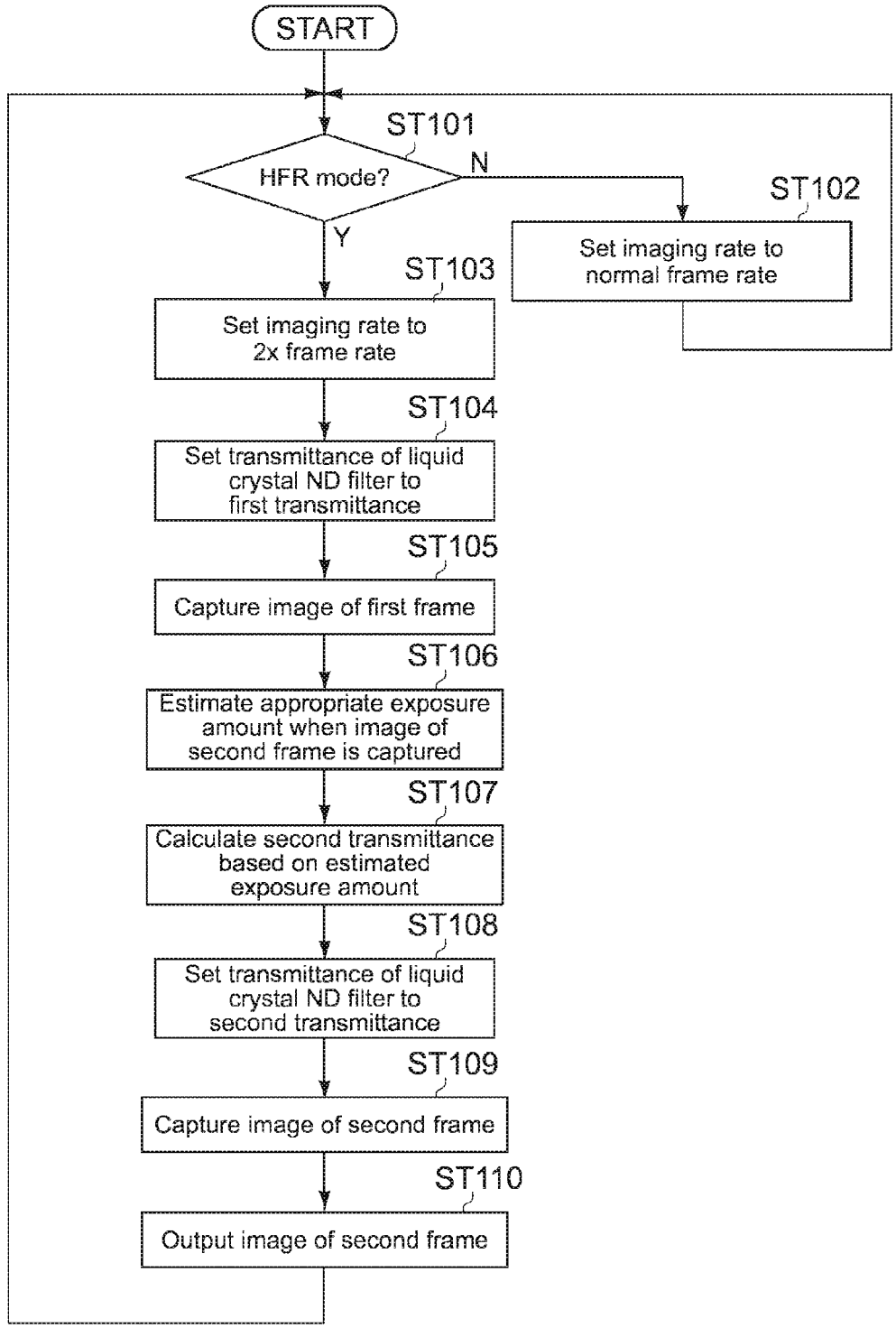
FIG. 2 is a flowchart showing processing of the imaging apparatus according to the first embodiment of the present technology.

Next, processing by the imaging apparatus 1 according to the first embodiment will be specifically described. FIG. 2 is a flowchart showing the processing of the imaging apparatus 1 according to the first embodiment.

First, the system controller 19 determines whether the current mode is the high frame rate mode or not (Step 101). It should be noted that the normal mode and the high frame rate mode can be switched with a mode switching button.

When the current mode is not the high frame rate mode (NO in Step 101), that is, when the current mode is the normal mode, the system controller 19 sets the imaging rate to the normal frame rate (for example, 30 fps) (Step 102).

The system controller 19 then instructs the timing generator 22 to cause the imaging device 13 to perform imaging at the normal frame rate.

On the other hand, when the current mode is the high frame rate mode (YES in Step 101), the system controller 19 sets the imaging rate to a frame rate twice as large as the normal frame rate (high frame rate: for example, 60 fps) (Step 103). The system controller 19 then instructs the timing generator 22 to cause the imaging device 13 to perform imaging at the frame rate twice as large as the normal frame rate.

Next, at an imaging timing of the first frame in high frame rate imaging, the system controller 19 instructs the liquid crystal ND driver 21 to set the transmittance of the liquid crystal ND filter 12 to a first transmittance (Step 104).

Specifically, the system controller 19 instructs the liquid crystal ND driver 21 to refer to the transmittance versus voltage table stored in the storage unit 18, read an applied voltage corresponding to the first transmittance, and apply the read applied voltage. In this embodiment, it is assumed that the first transmittance is a constant preset value. It should be noted that the system controller 19 may calculate a voltage in real time according to a program, instead of referring to the table.

When the transmittance of the liquid crystal ND filter 12 is set to the first transmittance, a subject image, which passes through the liquid crystal ND filter 12 for which the first transmittance is set, is combined on the exposure surface of the imaging device 13, so that an image of the first frame is captured by the imaging device 13 (Step 105). The image data of the first frame (first image data) is subjected to the CDS processing or the gain processing by the analog signal processing unit 23, and then converted into digital signals by the A/D conversion unit 24.

The digital signal processing unit 25 detects the image data of the first frame, which is converted into digital signals, and outputs a detection result to the system controller 19.

It should be noted that the image data of the first frame is not data used for display and/or recording. Thus, the image data of the first frame is not output to the image display unit 15 and the image saving unit 16.

Next, the system controller 19 estimates an appropriate exposure amount in the imaging device 13 when an image of the second frame is captured, on the basis of the detection result of the image data of the first frame (Step 106).

Figure 3:
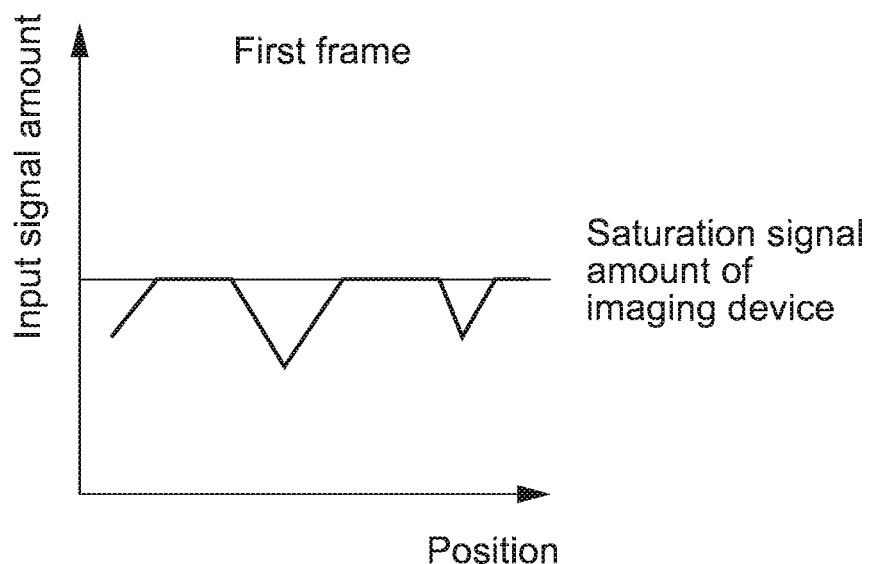
FIG. 3 is a diagram showing an example of a detection result in image data of the first frame.

FIG. 3 is a diagram showing an example of the detection result in the image data of the first frame. In FIG. 3, the horizontal axis represents the position of each pixel, and the vertical axis represents an input signal amount to the digital signal processing unit 25.

In the example shown in FIG. 3, an exemplary case is shown in which the exposure amount of the imaging device 13 is too much, the input signal amount of some pixels reaches a saturation signal amount, and gradation in such a part reaching the saturation signal amount is impaired. It should be noted that the part in which gradation is impaired cannot be restored in the digital signal processing unit 25.

In the estimation of an appropriate exposure amount in Step 106, first, the system controller 19 determines the number of pixels reaching the saturation signal amount, on the basis of the detection result of the image data of the first frame. Next, the system controller 19 calculates a ratio of the number of pixels reaching the saturation signal amount to the total number of pixels. On the basis of this ratio, the system controller 19 estimates an exposure amount when an image of the second frame is captured. Typically, it is presumed that the system controller 19 should perform imaging in a smaller exposure amount in the second frame, as the ratio in the first frame is larger.

In this estimation, the system controller 19 refers to the saturation pixel ratio versus exposure amount table stored in the recording unit and reads an exposure amount corresponding to the saturation pixel ratio, to estimate an appropriate exposure amount when an image of the second frame is captured. It should be noted that in the estimation of the exposure amount, the system controller 19 may calculate the exposure amount in real time according to a program, instead of referring to the table.

After estimating an appropriate exposure amount at the time an image of the second frame is captured, the system controller 19 then calculates a second transmittance on the basis of the estimated exposure amount, the second transmittance being the transmittance of the liquid crystal ND filter 12 when an image of the second frame is captured (Step 107).

Specifically, the system controller 19 refers to the exposure amount versus transmittance table and reads a second transmittance corresponding to the estimated exposure amount, to calculate the second transmittance. It should be noted that the system controller 19 may calculate the second transmittance in real time according to a program, instead of referring to the table.

After calculating the second transmittance, the system controller 19 then instructs the liquid crystal ND driver 21 to set the transmittance of the liquid crystal ND filter 12 to the second transmittance at the imaging timing of the second frame in the high frame rate imaging (Step 108).

Specifically, the system controller 19 instructs the liquid crystal ND driver 21 to refer to the transmittance versus voltage table stored in the storage unit 18, read an applied voltage corresponding to the second transmittance, and apply the read applied voltage.

It should be noted that in this embodiment, it is necessary to change the transmittance of the liquid crystal ND filter 12 from the first transmittance to the second transmittance during a period of time between imaging and the next imaging (for example, 16.7 ms) in the high frame rate imaging. A change in transmittance in such a short period of time can be realized by using the liquid crystal ND filter 12 having high-speed responsiveness.

When the transmittance of the liquid crystal ND filter 12 is set to the second transmittance, a subject image, which passes through the liquid crystal ND filter 12 for which the second transmittance is set, is combined on the exposure surface of the imaging device 13, so that an image of the second frame is captured by the imaging device 13 (Step 109).

The image data of the second frame (second image data) is subjected to the CDS processing or the gain processing by the analog signal processing unit 23, and then converted into digital signals by the A/D conversion unit 24. The digital signal processing unit 25 acquires the image data of the second frame, which is converted into digital signals.

Figure 4:
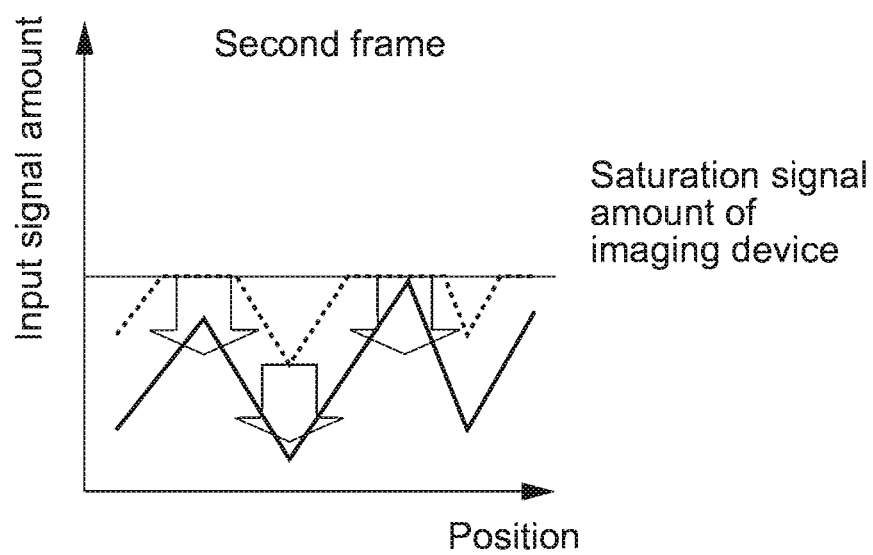
FIG. 4 is a diagram showing an example of image data of the second frame, which is input to a digital signal processing unit.

FIG. 4 is a diagram showing an example of the image data of the second frame, which is input to the digital signal processing unit 25. In FIG. 4, similarly to FIG. 3, the horizontal axis represents the position of each pixel, and the vertical axis represents the input signal amount to the digital signal processing unit 25.

Further, in FIG. 4, a waveform when the transmittance of the liquid crystal ND filter 12 is the first transmittance is indicated by a broken line, and a waveform when the transmittance of the liquid crystal ND filter 12 is the second transmittance is indicated by a solid line.

Here, in this embodiment, when an image of the second frame is captured, the transmittance of the liquid crystal ND filter 12 is set to an appropriate transmittance (second transmittance), and the exposure amount of the imaging device 13 is set to an appropriate exposure amount. Therefore, it is possible to prevent a signal of each pixel, which is output from the imaging device 13, from reaching the saturation signal amount.

Therefore, as indicated by the solid line in FIG. 4, it is possible to prevent the input signal amount, which is input to the digital signal processing unit 25, from reaching the saturation signal amount. So, in this embodiment, it is possible to output image data in which a dynamic range of the imaging device 13 is maximized.

After acquiring the image data of the second frame, which is converted into the digital signals, the digital signal processing unit 25 executes various types of digital signal processing such as noise removal processing, white balance adjustment processing, color correction processing, edge enhancement processing, and gamma correction processing. The digital signal output unit then outputs the image data of the second frame, which is subjected to the digital signal processing (Step 110).

It should be noted that in this embodiment, the image data of the first frame is not output, and only the image data of the second frame is output. Thus, the output rate of the image data that is output from the digital signal processing unit 25 (for example, 30 fps) is half the imaging rate (for example, 60 fps) by the imaging device 13. In this regard, in Step 103, the system controller 19 executes processing of setting the imaging rate to a rate twice as large as the output rate for outputting the image data.

When outputting the image data of the second frame, the digital signal processing unit 25 executes different processing, depending on whether the current mode is a still-image capturing mode or a moving-image capturing mode.

In other words, when the current mode is the still-image capturing mode, the digital signal processing unit 25 outputs the image data of the second frame to the image display unit 15, and causes the image display unit 15 to display a through image on the screen thereof. The digital signal processing unit 25 then outputs the image data of the second frame to the image saving unit 16 at a timing at which the shutter button is operated, and saves the image data of the second frame as a still image.

When the current mode is the moving-image capturing mode, as in the case where the mode is the still-image capturing mode, the digital signal processing unit 25 outputs the image data of the second frame to the image display unit 15, and causes the image display unit 15 to display a through image on the screen thereof. On the other hand, unlike the case where the mode is the still-image capturing mode, the digital image processing unit certainly outputs the image data of the second frame to the image saving unit 16. The image of the second frame is saved in the image saving unit 16 as an image constituting a part of the moving image.

After the image data of the second frame is output from the digital signal output unit, the system controller 19 returns to Step 101 again and determines whether the current mode is the high frame rate mode or not.

When the current mode is the high frame rate mode (YES in Step 101), the series of processing from Step 103 to Step 110 is repeatedly executed.

It should be noted that in Step 104 in the second and subsequent cycles, it is necessary to change the transmittance of the liquid crystal ND filter 12 from the second transmittance to the first transmittance during a predetermined period of time (for example, 16.7 ms). This can be realized by using the liquid crystal ND filter 12 having high-speed responsiveness.

[Action Etc.]

As described above, in this embodiment, the image data of the first frame is used as image data for estimating an exposure amount (appropriate exposure amount) when the image data of the second frame is captured. Further, the image data of the first frame is used as image data for calculating a second transmittance (appropriate transmittance) that is a transmittance of the liquid crystal ND filter 12 when the image data of the second frame is captured. The transmittance of the liquid crystal ND filter 12 is set to the second transmittance, the image data of the second frame is acquired, and an image of the second frame is output, whereas the image data of the first frame is not output. As a result, in this embodiment, it is possible to output the image data, which is output from the imaging device 13, as image data of an appropriate exposure amount.

In addition, in this embodiment, the second transmittance is set such that the exposure amount of the imaging device 13 becomes an appropriate exposure amount. Thus, it is possible to prevent a signal of each pixel output from the imaging device 13 from reaching the saturation signal amount in the image data of the second frame (see FIG. 4). So, in this embodiment, it is possible to output image data in which a dynamic range of the imaging device 13 is maximized.

In particular, in this embodiment, when the second transmittance is calculated, the second transmittance is calculated on the basis of a ratio of the number of pixels reaching the saturation signal amount to the total number of pixels in the image data of the first frame. Thus, it is possible to effectively prevent a signal of each pixel output from the imaging device 13 from reaching the saturation signal amount in the image data of the second frame.

Further, in this embodiment, by repetition of the series of processing from Step 103 to Step 110, it is possible to constantly output the image data, which is output from the imaging device 13, as image data of an appropriate exposure amount.

In addition, in this embodiment, since it is not necessary to adjust exposure by the electronic shutter, it is possible to prevent a dynamic resolution from being disturbed. Further, in this embodiment, since it is not necessary to adjust exposure by the aperture of the diaphragm 11, it is possible to prevent degradation of the image quality due to blurring caused by the diaphragm 11 or an influence on the depth of field. It should be noted that there is a problem that the diaphragm 11 has a slow response speed and makes it difficult to change the aperture to another aperture within a predetermined period of time (for example, 16.7 ms). On the other hand, the liquid crystal ND filter 12 enables the transmittance to be changed to another transmittance within a predetermined period of time (for example, 16.7 ms).

Here, in order to adjust the exposure amount, a method of setting a negative gain in the gain processing of the analog signal processing unit 23 is also conceived. However, in general, the width of the negative gain in the analog signal processing unit 23 is only about −3 dB, and thus it is not effective as a method of adjusting the exposure amount. Further, there is also a case where noise fluctuates between the frames. On the other hand, in this embodiment, since it is not necessary to adopt such a method, it is possible to prevent occurrence of noise.

Further, in order to adjust the exposure amount, a case where a plurality of ND filters (different from the liquid crystal ND filter 12 and having a non-variable transmittance) is adopted is also conceived. However, in the case of such ND filters, there is a problem that a response speed is slow and there is a further problem that the appropriate exposure amount cannot be adjusted because the density is finite. In addition, when the ND filter is switched to another ND filter, there is a problem that an invalid frame occurs. On the other hand, in this embodiment, since the liquid crystal ND filter 12 is used, those problems do not occur.

It should be noted that it is also possible not to eliminate exposure adjustment by the electronic shutter, the diaphragm 11, the analog signal processing, and the ND filter, but to combine the exposure adjustment according to the present technology with the exposure adjustment by those above.

Modified Example of First Embodiment

In the example of the first embodiment, the case has been described in which an appropriate exposure amount when the image data of the second frame is captured is estimated on the basis of the image data of the first frame, and the second transmittance is calculated on the basis of the estimated exposure amount. On the other hand, the second transmittance may be directly calculated on the basis of the image data of the first frame.

In the description above, the case where the series of processing from Step 103 to Step 110 is repeatedly executed has been described. On the other hand, the processing from Step 103 to Step 110 may not be necessarily executed repeatedly, and may be terminated at one time.

As one example, for example, in the still-image capturing mode, at a timing other than the timing at which the shutter button is operated, imaging at the normal frame rate is performed in the imaging device 13, and the image data is output from the digital signal processing unit 25 at the normal frame rate. This image data is output to the image display unit 15 and displayed as a through image on the screen of the image display unit 15.

When the shutter button is operated, at this timing, imaging at the high frame rate is performed in the imaging device 13. At that time, the image data of the first frame is used to estimate an exposure amount when the image data of the second frame is captured (used to calculate the second transmittance), and only the image data of the second frame is output. The image data of the second frame is output to the image display unit 15 and displayed as a through image on the screen of the image display unit 15. Further, the image data of the second frame is output to the image saving unit 16 and saved as still image data in the image saving unit 16.

Here, for example, it is also possible to perform imaging at the high frame rate in predetermined cycles, and perform imaging at the normal frame rate in other cycles. In this case, the imaging at the high frame rate is performed in every five times of imaging, for example.

In the description of the first embodiment, the case where the normal mode and the high frame rate mode are switched with the mode switching button has been described. On the other hand, the system controller 19 may automatically switch between the normal mode and the high frame rate mode.

As one example, for example, the system controller 19 performs imaging at the normal frame rate in the normal mode and determines whether the ratio of the pixels reaching the saturation signal amount in the image data captured at that frame rate exceeds a predetermined threshold value or not. When image data exceeding the threshold value are continuously obtained (for example, approximately 10 pieces of image data), the system controller 19 switches the normal mode to the high frame rate mode.

In the description of the first embodiment, the case where the first transmittance is constant has been described. On the other hand, the first transmittance may be controlled to be variable. In this case, for example, each time the image data of the first frame is acquired, the system controller 19 determines the ratio of pixels reaching the saturation signal amount and stores the ratio in the storage unit 18, to generate a history of the ratio.

On the basis of the change tendency of that ratio, the system controller 19 then changes the first transmittance. For example, when the change tendency of the ratio tends to increase, the system controller 19 changes the first transmittance so as to be reduced, and when the change tendency of the ratio tends to decrease, the system controller 19 changes the first transmittance so as to be increased.

As another example, for example, the system controller 19 may change the first transmittance on the basis of the second transmittance. In this case, each time the system controller 19 calculates the second transmittance, the system controller 19 causes the storage unit 18 to store the second transmittance, to generate a history of the second transmittance.

The system controller 19 then changes the first transmittance on the basis of the change tendency of the second transmittance. For example, when the change tendency of the second transmittance tends to increase, the system controller 19 changes the first transmittance so as to be increased, and when the change tendency of the second transmittance tends to decrease, the system controller 19 changes the first transmittance so as to be reduced.

In such a manner, when the first transmittance is controlled to be variable, the difference between the first transmittance and the second transmittance is reduced. Thus, it is possible to cope with a case where a frame rate in the high frame rate imaging is further increased.

In the description of the first embodiment, as an example, the case has been described in which when the exposure amount at the time the image data of the first frame is captured is large, the exposure amount at the time the image data of the second frame is captured is reduced (the second transmittance is reduced) accordingly. On the other hand, when the exposure amount at the time the image data of the first frame is captured is small, the exposure amount at the time the image data of the second frame is captured can be increased (the second transmittance can also be increased) accordingly.

Second Embodiment

Next, a second embodiment of the present technology will be described. In the description of the second embodiment and following parts, units having the same configurations and functions as those of the first embodiment described above are denoted by the same reference symbols and description thereof will be omitted or simplified. Further, in the description of the second embodiment and following parts, differences from the first embodiment described above (and the modified example of the first embodiment) will be mainly described.

In particular, the second embodiment is different from the first embodiment described above in that when a transmittance of a liquid crystal ND filter 12 is set to a second transmittance, image data of the third frame is captured in addition to image data of the second frame. Further, the second embodiment is different from the first embodiment described above in that the image data of the second frame and the image data of the third frame are added (combined), and the added image data is output as high-dynamic-range image data from a digital signal output unit. Therefore, the differences will be mainly described.

It should be noted that in the second embodiment, a normal mode and a high dynamic range mode are prepared as modes. Further, in the second embodiment, a mode switching button can switch between those two modes. It should be noted that in this description, the switching between two modes of the normal mode and the high dynamic range mode will be described, whereas switching among three modes of the normal mode, the high frame rate mode, and the high dynamic range mode can also be performed.

[Description on Operation]

Figure 5:
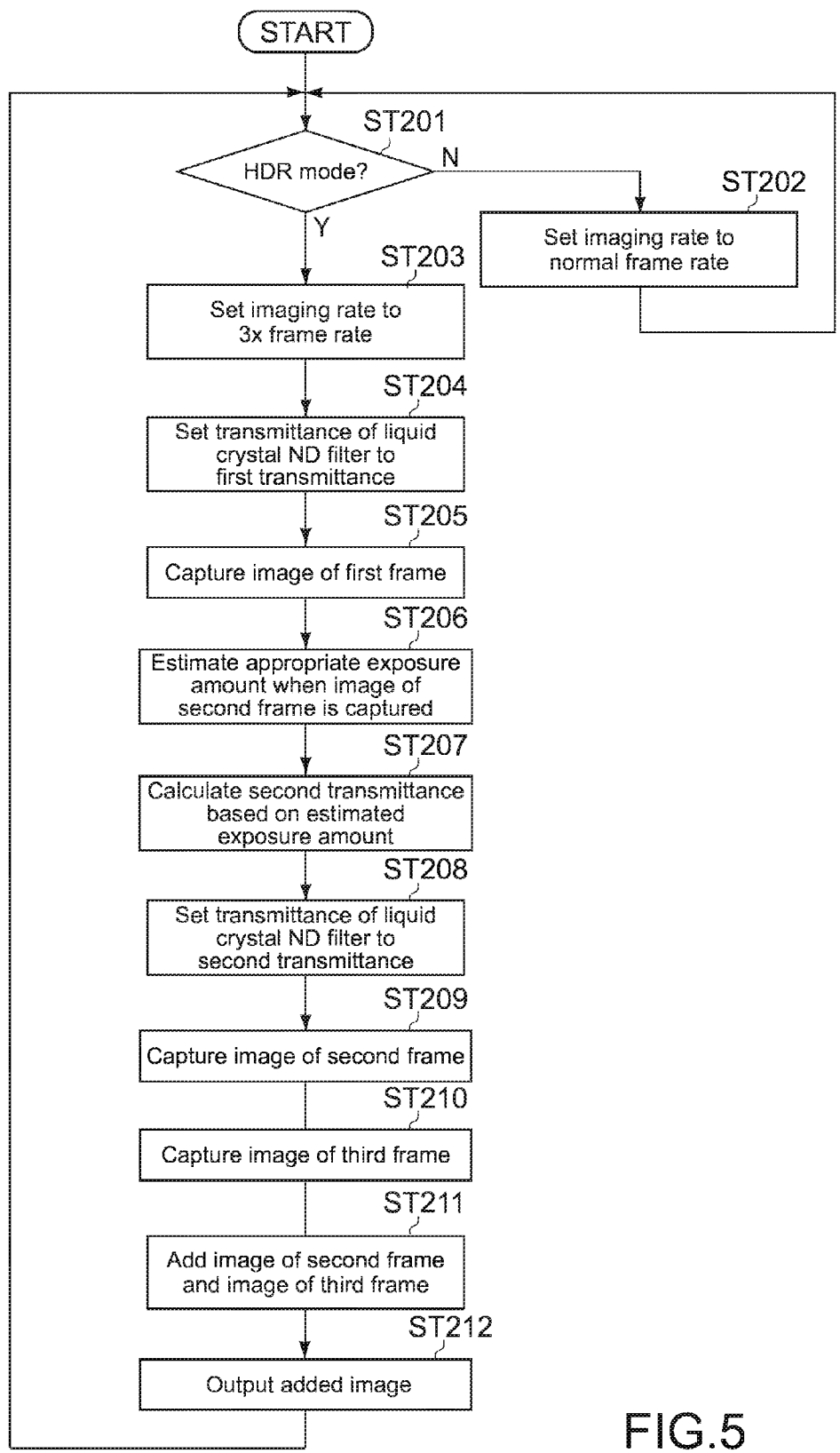
FIG. 5 is a flowchart showing processing of an imaging apparatus according to a second embodiment of the present technology.

FIG. 5 is a flowchart showing processing of an imaging apparatus 1 according to a second embodiment. As shown in FIG. 5, first, a system controller 19 determines whether the current mode is the high dynamic range mode or not (Step 201).

When the current mode is not the high dynamic range mode (NO in Step 201), that is, when the current mode is the normal mode, the system controller 19 sets the imaging rate to the normal frame rate (for example, 30 fps) (Step 202).

On the other hand, when the current mode is the high dynamic range mode (YES in Step 201), the system controller 19 sets the imaging rate to a frame rate three times as large as the normal frame rate (high frame rate: for example, 90 fps) (Step 203). That is, the system controller 19 sets the imaging rate to a rate three times as large as the output rate for outputting the image data.

Next, the system controller 19 instructs the liquid crystal ND driver 21 to set the transmittance of the liquid crystal ND filter 12 to a first transmittance at the imaging timing of the first frame in the high frame rate imaging (Step 204).

The system controller 19 then causes the imaging device 13 to capture an image of the first frame (Step 205). The digital signal processing unit 25 detects image data of the first frame, which is converted into digital signals, and outputs a detection result to the system controller 19. It should be noted that the image data of the first frame is not output to the image display unit 15 and the image saving unit 16.

Next, the system controller 19 estimates an appropriate exposure amount in the imaging device 13 at the time images of the second frame and the third frame are captured, on the basis of the detection result of the image data of the first frame (Step 206).

After estimating an appropriate exposure amount at the time the images of the second frame and the third frame are captured, the system controller 19 then calculates a second transmittance on the basis of the estimated exposure amount (Step 207).

After calculating the second transmittance, the system controller 19 then instructs the liquid crystal ND driver 21 to set the transmittance of the liquid crystal ND filter 12 to the second transmittance at the imaging timing of the second frame in the high frame rate imaging (Step 208).

Next, the system controller 19 causes the imaging device 13 to capture an image of the second frame (Step 209).

Next, the system controller 19 causes the imaging device 13 to capture an image of the third frame at the imaging timing of the third frame in the high frame rate imaging (Step 210).

Next, the digital signal output unit adds the image data of the second frame and the image data of the third frame (Step 211). The digital signal output unit then outputs the added image data as high-dynamic-range image data to the image display unit 15 and the image saving unit 16 (Step 212).

It should be noted that in the second embodiment, the output rate of the image data (for example, 30 fps) is ⅓ of the imaging rate (for example, 90 fps) by the imaging device 13.

After the high dynamic image data is output from the digital signal output unit, the system controller 19 returns to Step 101 again and determines whether the current mode is the high dynamic range mode or not.

When the current mode is the high dynamic range mode (YES in Step 201), the series of processing from Step 203 to Step 212 is repeatedly executed.

Figure 6:
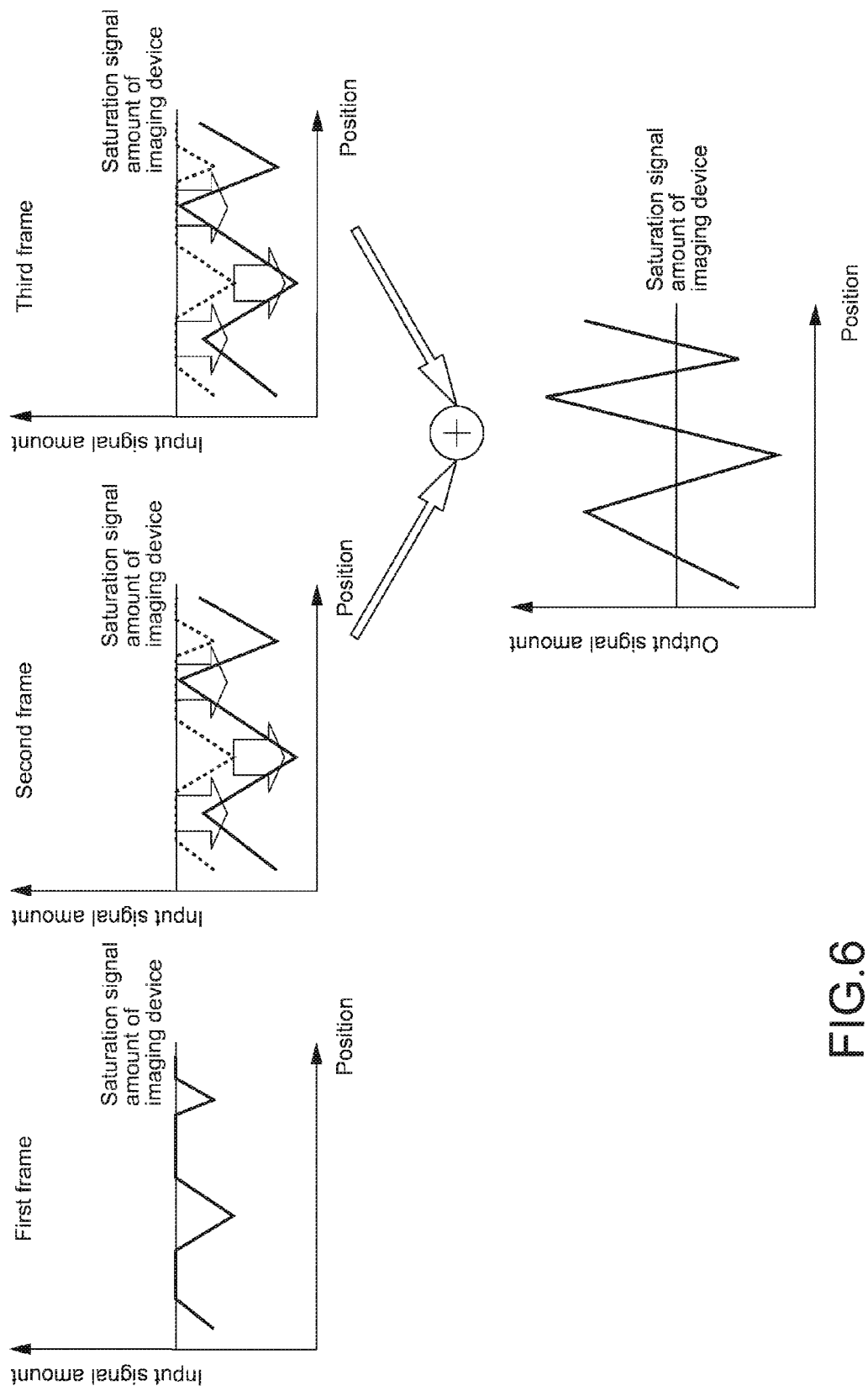
FIG. 6 is a diagram showing a state in which the image data of the second frame and image data of the third frame are added.

FIG. 6 is a diagram showing a state in which the image data of the second frame and the image data of the third frame are added.

In the image data of the second frame and the image data of the third frame, when those pieces of image data are captured, the second transmittance is set such that the exposure amount of the imaging device 13 is an appropriate exposure amount. Thus, as shown in FIG. 6, at the time the image data of the second frame and the image data of the third frame are input to the digital signal processing unit 25, it is possible to prevent the signal of each pixel from reaching the saturation signal amount. So, in the second embodiment, as shown in FIG. 6, it is possible to output high-dynamic-range image data from the digital signal processing unit 25, the high-dynamic-range image data holding gradation of high luminance signals, which cannot be output due to the limit of the saturation signal amount of the imaging device 13 under ordinary circumstances.

Modified Example of Second Embodiment

In the description of the second embodiment, the case has been described in which two pieces of image data are captured with the transmittance of the ND liquid crystal filter being set to the second transmittance, and those two pieces of image data are added to be output from the digital signal processing unit 25. On the other hand, three pieces of image data may be captured with the transmittance of the ND liquid crystal filter being set to the second transmittance, and those three pieces of image data may be added to be output from the digital signal processing unit 25.

In the second embodiment as well, similarly to the modified example of the first embodiment, the first transmittance may be controlled to be variable. Further, in the second embodiment as well, similarly to the modified example of the first embodiment, when the exposure amount at the time the image data of the first frame is captured is small, the exposure amount at the time the pieces of image data of the second frame and the third frame (or more) are captured can be increased (the second transmittance can be increased) accordingly.

The present technology can also have the following configurations.

(1) An imaging apparatus, including:
a transmittance adjustment unit that is capable of adjusting a transmittance of light in accordance with an applied voltage;
an imaging device that performs imaging by exposure of light passing through the transmittance adjustment unit; and
a control unit that acquires first image data by setting a transmittance of the transmittance adjustment unit to a first transmittance and causing the imaging device to perform imaging, calculates a second transmittance on the basis of the first image data to cause the imaging device to perform imaging in an appropriate exposure amount, acquires second image data by setting the transmittance of the transmittance adjustment unit to the second transmittance and causing the imaging device to perform imaging, and outputs the acquired second image data.

(2) The imaging apparatus according to (1), in which
the control unit acquires the second image data and third image data by setting the transmittance of the transmittance adjustment unit to the second transmittance and causing the imaging device to perform imaging, adds the second image data and the third image data, and outputs the added image data.

(3) The imaging apparatus according to (1) or (2), in which
the control unit controls the first transmittance to be variable.

(4) The imaging apparatus according to any one of (1) to (3), in which
the imaging device includes a plurality of pixels, and
when the control unit calculates the second transmittance on the basis of the first image data, the control unit determines a ratio of the number of pixels reaching a saturation signal amount to the total number of pixels in the first image data, and calculates the second transmittance on the basis of the ratio.

(5) The imaging apparatus according to any one of (1) to (4), in which
the control unit repeatedly executes a series of processing of acquiring the first image data, calculating the second transmittance, acquiring the second image data, and outputting the second image data.

(6) The imaging apparatus according to any one of (2) to (5), in which
the control unit repeatedly executes a series of processing of acquiring the first image data, calculating the second transmittance, acquiring the second image data and the third image data, adding the second image data and the third image data, and outputting the added image data.

(7) The imaging apparatus according to any one of (1) to (6), in which
the transmittance adjustment unit is a liquid crystal ND (Neutral Density) filter.

(8) A method of outputting image data, including:
acquiring first image data by setting a transmittance of a transmittance adjustment unit to a first transmittance and causing an imaging device to perform imaging, the transmittance adjustment unit being capable of adjusting a transmittance of light in accordance with an applied voltage, the imaging device performing exposure of light passing through the transmittance adjustment unit;
calculating a second transmittance on the basis of the first image data to cause the imaging device to perform imaging in an appropriate exposure amount;
acquiring second image data by setting the transmittance of the transmittance adjustment unit to the second transmittance and causing the imaging device to perform imaging; and
outputting the acquired second image data.

(9) A program causing an imaging apparatus to execute the steps of:
acquiring first image data by setting a transmittance of a transmittance adjustment unit to a first transmittance and causing an imaging device to perform imaging, the transmittance adjustment unit being capable of adjusting a transmittance of light in accordance with an applied voltage, the imaging device performing exposure of light passing through the transmittance adjustment unit;
calculating a second transmittance on the basis of the first image data to cause the imaging device to perform imaging in an appropriate exposure amount;
acquiring second image data by setting the transmittance of the transmittance adjustment unit to the second transmittance and causing the imaging device to perform imaging; and
outputting the acquired second image data.

DESCRIPTION OF SYMBOLS 1 imaging apparatus
10 lens system
12 liquid crystal ND filter
13 imaging device
14 control unit 15 image display unit
16 image saving unit
17 operation unit
18 storage unit
19 system controller
20 lens driver
21 ND driver
22 timing generator
23 analog signal processing unit
24 A/D conversion unit
25 digital signal processing unit

The invention claimed is:

1. An imaging apparatus, comprising:
a filter configured to change a transmittance of light passing through the filter in accordance with an applied voltage;
an imaging device configured to perform imaging by exposure to light passing through the filter, the imaging device including a plurality of pixels; and
processing circuitry configured to
acquire first image data by setting a transmittance of the filter to a first transmittance and causing the imaging device to perform first imaging;
determine a ratio of a number of pixels reaching a saturation signal amount to a total number of pixels in the first image data;
determine a second transmittance of the filter based on the ratio;
acquire second image data by setting the transmittance of the filter to the second transmittance and causing the imaging device to perform imaging; and
output at least one of the acquired second image data and third image data acquired using the second transmittance.

2. The imaging apparatus according to claim 1, wherein the processing circuitry is configured to:
acquire the second image data and the third image data by setting the transmittance of the filter to the second transmittance and causing the imaging device to perform imaging;
add the second image data and the third image data; and
output the added image data.

3. The imaging apparatus according to claim 2, wherein the processing circuitry is configured to repeatedly execute a series of processing of acquiring the first image data, determining the second transmittance, acquiring the second image data and the third image data, adding the second image data and the third image data, and outputting the added image data.

4. The imaging apparatus according to claim 1, wherein the processing circuitry is configured to variably control the first transmittance.

5. The imaging apparatus according to claim 1, wherein the processing circuitry is configured to repeatedly execute a series of processing of acquiring the first image data, determining the second transmittance, acquiring the second image data, and outputting at least one of the second image data and the third image data.

6. The imaging apparatus according to claim 1, wherein the filter is a liquid crystal ND (Neutral Density) filter.

7. A method of outputting image data, comprising:
acquiring first image data by setting a transmittance of a filter to a first transmittance and causing an imaging device to perform imaging, the filter being configured to change a transmittance of light passing through the filter in accordance with an applied voltage, the imaging device being configured to perform the imaging by exposure to light passing through the filter, the imaging device including a plurality of pixels;
determining, using processing circuitry, a ratio of a number of pixels reaching a saturation signal amount to a total number of pixels in the first image data;
determining, using the processing circuitry, a second transmittance of the filter based on the ratio;
acquiring second image data by setting the transmittance of the filter to the second transmittance and causing the imaging device to perform imaging; and
outputting at least one of the acquired second image data and third image data acquired using the second transmittance.

8. A non-transitory computer readable medium including executable instructions, which when executed by a computer cause the computer to execute a method of outputting image data, the method comprising:
acquiring first image data by setting a transmittance of a filter to a first transmittance and causing an imaging device to perform imaging, the filter being configured to change a transmittance of light passing through the filter in accordance with an applied voltage, the imaging device being configured to perform the imaging by exposure to light passing through the filter, the imaging device including a plurality of pixels;
determining a ratio of a number of pixels reaching a saturation signal amount to a total number of pixels in the first image data;
determining a second transmittance of the filter based on the ratio;
acquiring second image data by setting the transmittance of the filter to the second transmittance and causing the imaging device to perform imaging; and
outputting at least one of the acquired second image data and third image data acquired using the second transmittance.

9. An image processing apparatus, comprising:
a memory; and
processing circuitry configured to
acquire first image data by setting a transmittance of a filter to a first transmittance and cause an imaging device to perform imaging, the filter being configured to change a transmittance of light passing through the filter in accordance with an applied voltage, the imaging device being configured to perform the imaging by exposure to light passing through the filter, the imaging device including a plurality of pixels;
determine a ratio of a number of pixels reaching a saturation signal amount to a total number of pixels in the first image data;
determine a second transmittance of the filter based on the ratio;
acquire second image data by setting the transmittance of the filter to the second transmittance and causing the imaging device to perform imaging; and
output at least one of the acquired second image data and third image data acquired using the second transmittance.

* * * * *